United States Patent
Yamamori et al.

(10) Patent No.: US 6,848,535 B2
(45) Date of Patent: Feb. 1, 2005

(54) TRANSMISSION RATIO VARIABLE MECHANISM

(75) Inventors: Motoyasu Yamamori, Nagoya (JP);
Osamu Watanabe, Okazaki (JP);
Morihiro Matsuda, Toyota (JP);
Shoichi Shono, Nishikamo-gun (JP);
Akihiro Yanaka, Toyota (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/368,575

(22) Filed: Feb. 20, 2003

(65) Prior Publication Data

US 2003/0178242 A1 Sep. 25, 2003

(30) Foreign Application Priority Data

Feb. 20, 2002 (JP) ........................................ 2002-042465

(51) Int. Cl.[7] ............................................... B62D 5/04
(52) U.S. Cl. ...................................................... 180/444
(58) Field of Search ................................ 180/443, 444, 180/445, 446

(56) References Cited

U.S. PATENT DOCUMENTS

| | | |
|---|---|---|
| 6,164,150 A | 12/2000 | Shindo et al. |
| 6,199,654 B1 | 3/2001 | Kojo et al. |
| 6,273,211 B1 * | 8/2001 | Engels et al. ................ 180/446 |

FOREIGN PATENT DOCUMENTS

| | | |
|---|---|---|
| DE | 197 55 312 | 6/1999 |
| DE | 199 08 357 | 8/2000 |
| JP | 10-324263 | 12/1998 |
| JP | 2000-199532 | 7/2000 |
| JP | 2001-82982 | 3/2001 |

* cited by examiner

*Primary Examiner*—Kevin Hurley
(74) *Attorney, Agent, or Firm*—Oblon, Spivak, McClelland, Maier & Neustadt, P.C.

(57) ABSTRACT

A transmission ratio variable mechanism (100) varies a transmission ratio between a steering amount of a steering wheel (2) and a turning amount of wheels (7). The transmission ratio variable mechanism (100) includes an input shaft (3) transmitted with a rotational force of the steering wheel (2), a housing (102, 103) unitarily rotating with the input shaft (3), an output shaft (4) connected to wheels side, a motor (160) fixed in the housing for transmitting the rotation to the output shaft (4) via a speed reduction device (150), and a reverse input blocking device (180) for always transmitting a rotational output from the motor (160) to the output shaft (4) and for always blocking a rotational input from the output shaft (4) to the motor (160).

9 Claims, 3 Drawing Sheets

TRANSMISSION RATIO VARIABLE MECHANISM

This application is based on and claims priority under 35 U.S.C. § 119 with respect to Japanese Patent Application No. 2002-042465 filed on Feb. 20, 2002, the entire content of which is incorporated herein by reference.

FIELD OF THE INVENTION

The present invention relates to a transmission ratio variable mechanism. More particularly, the present invention pertains to a transmission ratio variable mechanism which varies a transmission ratio between a steering amount of a steering wheel and a turning amount of vehicle wheels.

BACKGROUND OF THE INVENTION

A known transmission ratio variable mechanism disposed between a steering wheel and gear device such as rack and pinion mechanism for varying a transmission ratio between a steering amount of the steering wheel and a turning amount of vehicle wheels is disclosed in Japanese Patent Laid-Open Publication No. H10-324263.

The known transmission ratio variable mechanism includes a direct connection means. The direct connection means restrict a relative rotation between an input shaft and output shaft when reverse input or an abnormality of a motor. Accordingly the transmission ratio variable mechanism prevent a deviation between the steering amount of the steering wheel and turning amount of the wheels in case a torque is applied from an output shaft of the transmission ratio variable mechanism due to the reverse input or in case of the stop of motor rotation due to the abnormality.

Notwithstanding, with the construction of the known transmission ratio variable mechanism, assembling of the direct connection means is complex. In addition, a detection means for detecting the abnormality of the motor and the reverse input and a control means for commanding the operation of the direct connection means are additionally required for operating the connection means.

This increases the number of parts and manufacturing costs. Further, the known transmission ratio variable mechanism with the foregoing construction has a drawback that it requires a response time from the detection of the abnormality of the motor or the reverse input by the detection means until the operation of the direct connection means is completed by commanding the operation of the direct connection portion by the control means.

A need thus exists for a transmission ratio variable mechanism which can maintain a relation between a steering amount of a steering wheel and a turning amount of wheels even when a reverse input from the turning wheels side is input or an abnormality of the motor are generated without providing a direct connection means which requires an additional detection means and a control means.

SUMMARY OF THE INVENTION

In light of the foregoing, the present invention provides a transmission ratio variable mechanism for varying a transmission ratio between a steering amount of a steering wheel and a turning amount of wheels, which includes an input shaft transmitted with a rotational force of the steering wheel, a housing unitarily rotating with the input shaft, an output shaft connected to wheels side, a motor fixed in the housing for transmitting the rotation to the output shaft via a speed reduction device, and a reverse input blocking device for always transmitting a rotational output from the motor to the output shaft and for always blocking a rotational input from the output shaft to the motor.

According to another aspect to of the invention, a steering device including a transmission ratio variable mechanism for varying a transmission ratio between a steering amount of a steering wheel and a turning amount of wheels includes the steering wheel operated for providing a rotational force, the wheels turned in accordance with the rotational force from the steering wheel, a rack and pinion mechanism including a rack shaft, and a transfer mechanism provided between the rack shaft and the wheels. The transmission ratio variable mechanism includes an input shaft transmitted with the rotational force of the steering wheel, a housing unitarily rotating with the input shaft, an output shaft connected to the rack and pinion mechanism, a motor fixed in the housing for transmitting the rotation to the output shaft via a speed reduction device, and a reverse input blocking device for always transmitting a rotational output from the motor to the output shaft and for always blocking a rotational input from the output shaft to the motor.

BRIEF DESCRIPTION OF THE DRAWING FIGURES

The foregoing and, additional features and characteristics of the present invention will become more apparent from the following detailed description considered with reference to the accompanying drawing figures in which like reference numerals designate like elements.

DETAILED DESCRIPTION OF THE INVENTION

Figure 1:
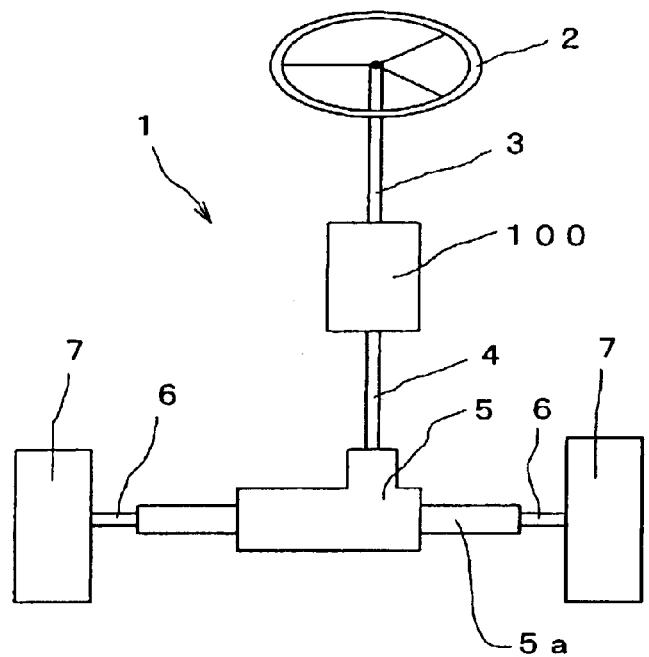
FIG. 1 is an overview of a steering device for a vehicle according to embodiments of the present invention.

Embodiments of a transmission ratio variable mechanism will be explained with reference to the illustrations of the drawing figures. FIG. 1 shows a construction of a steering device 1 for a vehicle applied with the transmission ratio variable mechanism according to the embodiments of the present invention.

As shown in FIG. 1, the steering device 1 for the vehicle includes a steering wheel 2. The steering wheel 2 is connected to a top end of a top steering shaft 3 serving as an input shaft. A bottom end of the top steering shaft 3 is connected to an input portion of a transmission ratio variable mechanism 100. An output portion of the transmission ratio variable mechanism 100 is connected to a top end of a bottom steering shaft 4 serving as an output shaft.

A bottom end of the bottom steering shaft 4 is assembled to a pinion (not shown) of a rack and pinion mechanism 5. Wheels 7 are provided on both ends of a rack shaft 5a of the rack and pinion mechanism 5 via a transfer mechanism 6.

Figure 2:
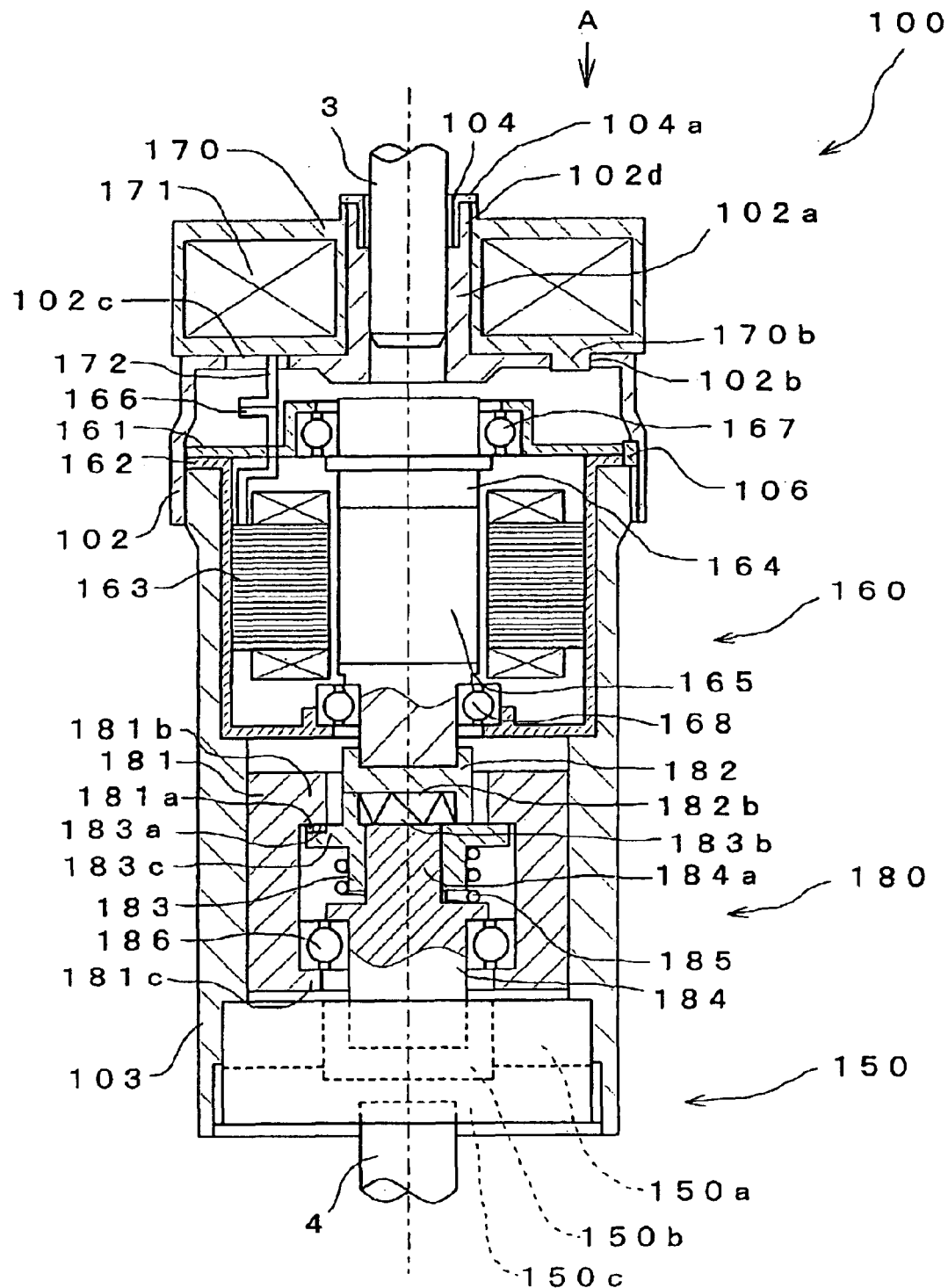
FIG. 2 is a lateral cross-sectional view of a transmission ratio variable mechanism according to a first embodiment of the present invention.

As shown in FIG. 2, the transmission ratio variable mechanisms 100 according to the first embodiment of the present invention includes a first housing 102, a second housing 103, a spiral cable case 170, a motor 160, a speed reduction device 150, and a reverse input blocking device 180.

An input shaft fitting portion 102a having a small cylindrical shape formed on a top portion of the housing 102 is secured to the top steering shaft 3 so that the housing 102 is unitarily rotatable with the top steering shaft 103. An external peripheral portion of the input shaft fitting portion 102a is provided with the spiral cable case 170 made of synthetic resin.

Figure 3:
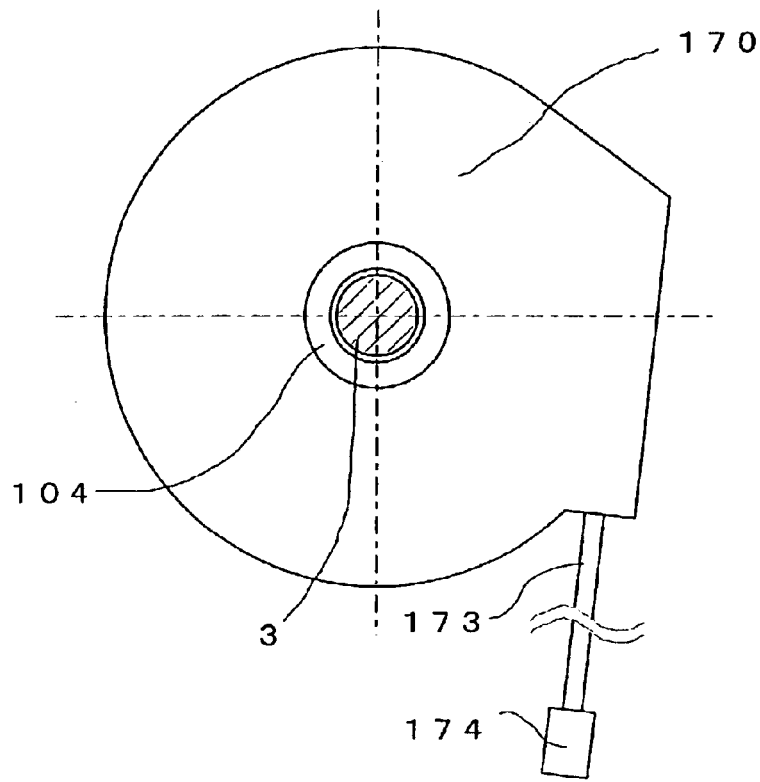
FIG. 3 is a view seen from arrow A of FIG. 2.

The spiral cable case 170 includes a convex portion 170b at a contact surface with the housing 102 and stores a spiral cable 171 therein. One end of the spiral cable 171 is pulled out to the outside of the contact surface between the spiral cable case 170 and the housing 102 via a spiral cable bus bar 172 to be extended in the housing 102 through a through hole 102c provided on the housing 102. On the other hand, the other end of the spiral cable 171 is pulled out to the outside of the spiral cable case 170 via a cable 173 to be connected to a connector 174 as shown in FIG. 3. The connector 174 is connected to a control device (not shown).

The convex portion 170b is inserted into a through hole 102b formed on the housing 102 to determine a position of the spiral cable case 170 and the housing 102 in a rotational direction. By inserting a bush 104 into a bush inserting portion 102d provided on the housing 102, the spiral cable case 170 is pushed in the axial direction to be fixed to the housing 102 by a flange portion 104a of the bush 104.

The housing 103 is unitarily connected to the housing 102. The housing 103 includes the motor 160, the reverse input blocking device 180, and the speed reduction device 150 which are arranged in this order from the input shaft side.

The motor 160 includes a motor housing 162, a stator 163, a motor rotational shaft 164, a rotor 165, and a motor end plate 161.

The stator 163 is fixed to an internal periphery of the approximate cylindrical shaped motor housing 162. The motor end plate 161 is provided for covering an opening portion of the motor housing 162.

The motor rotational shaft 164 is supported by a first bearing 167 and a second bearing 168 coaxially rotatably relative to the motor housing 162 and the motor end plate 161. An external periphery of the motor rotational shaft 164 is unitarily equipped with the rotor 165.

The motor 160 is unitarily fixed to the housing 103 by fitting the motor housing 162 to an internal periphery of the housing 103. A key groove is formed on the motor housing 162 and the motor end plate 161. By gearing a key 106 between the key formed on the motor housing 162 and the motor end plate 161 and a key groove formed on the housing 102, the position of the motor 160 relative to the housing 102 in the rotational direction is determined.

A motor bus bar 166 for supplying electric power to the stator 163 is pulled out from the motor end plate 161. The motor bus bar 166 is connected to the spiral cable bus bar 172.

The reverse input blocking device 180 includes a stationary member 181, a drive shaft 182, an intermediate member 183, and a driven shaft 184. The known reverse input blocking device is disclosed in Japanese Patent Laid-Open Published No. 2000-199532.

The stationary member 181 is unitarily fixed to the housing 103 to serve as a part of the housing. The cylindrical stationary member 181 includes lid portions 181b, 181c on both sides thereof. The driven shaft 184 is penetrated through the lid portion 181c to be rotatably supported by a bearing 186 and not to be moved in the axial direction. One end of the drive shaft 184 is formed with a small diameter portion 184a. The intermediate member 183 is provided on an external periphery of the small diameter portion 184a not to be rotated and to be movable in the axial direction. A disc shaped flange portion 183c is formed on the intermediate member 183. A coil spring 185 serving as a spring means is provided between the flange portion 183c and the driven shaft 184 to bias the flange portion 183c of the intermediate member 183 towards the lid portion 181b. Contacting surfaces of the flange portion 183c and the lid portion 181b are formed with clutch teeth 181a and clutch teeth 183a serving as clutch means respectively. A frictional clutch may be applied as the clutch means.

A first thrust cam 183b is provided at an internal periphery side of the clutch teeth 183a of the flange portion 183c. A second thrust cam 182b corresponding to the first thrust cam 183b is provided on an end surface periphery surface of the drive shaft 182. The thrust cams 183b, 182b serve as cam means. The other end of the drive shaft 182 is connected to the motor rotational shaft 164.

The intermediate member 183 is biased towards the drive shaft 182 side by the force of the coil spring 185 provided between the driven shaft 184 and the intermediate member 183 so that the first thrust cam 183b is fitted into the second thrust cam 182b of the drive shaft 182 and the clutch teeth 183a is geared with the clutch teeth 181a of the stationary member 181.

By forming an internal diameter small portion corresponding to the lid portions 181b, 181c of the stationary member 181 on the housing 103, and by providing the clutch teeth geared with the clutch teeth 183a of the intermediate member 183 at the internal diameter small portion on the side corresponding to the lid portion 181b, the housing 103 may include the function as the stationary member.

Known speed reduction device such as planetary gear mechanism or harmonic drive mechanism are applied as the speed reduction device 150. The speed reduction device 150 includes a fixed portion 150a, an input portion 150b, and an output portion 150c. The fixed portion 150a is provided not to be rotated relative to the housing 103, the driven shaft 184 of the reverse input blocking device 180 is connected to the input portion 150b, and the bottom steering shaft 4 is connected to the output portion 150c. The speed reduction device 150 decelerate the rotation of the input portion 150b input from the driven shaft 184 by predetermined speed ratio, and the speed reduction device 150 transmit this decelerated rotation to the output portion 150c so that fixed portion 150a and output portion 150b rotate relatively. Thus, when both the housing 103 and the driven shaft 184 of the reverse input blocking device 180 rotate, the decelerated rotational amount of the input portion 150b is added to the rotational amount of the fixed portion 150a to be transmitted to the output portion 150c.

The operation of the transmission ratio variable mechanism 100 under the condition that the rotational force is input from the steering wheel 2 side and the motor 160 normally functions will be explained.

By applying the rotational force from the steering wheel 2, the control device (not shown) outputs the rotational command to the motor 160 in accordance with the steering amount of the steering wheel 2 and so on. The rotational command is transmitted to the motor 160 through the spiral cable 171. The motor 160 is operated by the rotational command to rotate the motor rotational shaft 164 relative to the motor housing 162. The rotation of the motor rotational shaft 164 is transmitted to the unitarily connected drive shaft 182 of the reverse input blocking device 180.

At the initial stage when the drive shaft 182 is rotated, the intermediate member 183 and the stationary member 181 cannot be relatively rotated because the clutch teeth 183a of the intermediate member 183 is geared with the clutch teeth 181a of the stationary member 181. When the rotational force affects the drive shaft 182 under this condition, the intermediate member 183 moves in the axial direction by the function of the thrust cams 182b, 183b against the biasing force of the coil spring 185. By the movement of the intermediate member 183 in the axial direction, the geared connection between the clutch teeth 183a of the intermediate member 183 and the clutch teeth 181a of the stationary member 181 is eventually released. Thus, the intermediate member 183 is rotated relative to the stationary member 181 to be unitarily rotated with the driven shaft 184. Accordingly, the rotation of the drive shaft 182 is transmitted to the drive shaft 184 and thus to the input portion 150b of the speed reduction device 150. The rotation transmitted to the input portion 150b is decelerated to be transmitted to the output portion 150c. Thus, (he output portion 150c rotates relative to the fixed portion 150a.

The rotational force from the steering wheel 2 is also transmitted to the fixed portion 150a of the speed reduction device 150 via the top steering shaft 3, the housing 102, and the housing 103.

Accordingly, the output portion 150c is transmitted with the addition of the rotation directly transmitted to the fixed portion 150a of the speed reduction device 150 via the steering wheel 2 and the housing 103 and the relative rotational element from the motor 160 to be output to the bottom steering shaft 4. Thus, the transmission ratio between the steering wheel 2 and the wheels 7 is varied.

The operation under the condition that the reverse input is applied from the wheels 7 side to the transmission ratio variable mechanism 100 will be explained as follows.

When the reverse input is applied to the bottom steering shaft 4 from the wheels 7 side, the rotational force is transmitted to the output portion 150c of the speed reduction device 150 to try to transmit the rotational force to the input portion 150b of the speed reduction device 150. In this case, because the clutch teeth 183a of the intermediate member 183 is geared with the clutch teeth 181a of the stationary member 181 by biasing force of the coil spring 185, the driven shaft 184 is not rotatable relative to the stationary member 181. Because the stationary member 181 is provided unitarily with the fixing portion 150a of the speed reduction device 150 and the housing 103, the input portion 150b is unrotatable relative to the fixed portion 150a to lock the speed reduction device 150. Thus, the rotation is directly transmitted from the output portion 150c to the fixed portion 150a at the speed reduction device 150 and the rotation of the bottom steering shaft 4 is transmitted to the steering wheel 2 via the housings 102, 103, and the top steering shaft 3.

In case the motor 160 is failed to stop, the rotational force from the top steering shaft 3 is transmitted to the fixed portion 150a of the speed reduction device 150 via the housings 102, 103. Because the input from the speed reduction device 150 to the motor 160 is blocked by the reverse input blocking device 180 likewise the case of the reverse input, the fixed portion 150a and the input portion 150b are not relatively rotatable to lock the speed reduction device 150. Thus, because of the direct transmission of the rotation from the fixed portion 150a to the output portion 150c at the speed reduction device 150, the rotation of the top steering shaft 3 is transmitted to the bottom steering shaft 4 to turn the wheels 7.

As forgoing, the transmission ratio variable mechanism 100 does not cause the division between the steering amount of the steering wheel 2 and the turning amount of the wheels 7 without applying the electronic controlled direct connection means even when the reverse input from wheels 7 or the motor abnormality are generated. Accordingly, with the transmission ratio variable mechanism 100, the steering can be performed with a constant transmission ratio.

In addition, by arranging the reverse input blocking device 180 between the motor 160 and the speed reduction device 150, the rotational force applied to the clutch teeth 181a, 183a of the reverse input blocking device 180 can be reduced compared to the rotational force applied to the bottom steering shaft 4. And thus, the reverse input blocking device which endures smaller loads is applicable.

Although the stationary member 181 of the reverse input blocking device 180 is fixed to the housing 103 not to be rotatable, the stationary member 181 may be fixed not to be rotatable via other parts fixed to the housing 103 not to be rotatable. For example, the stationary member 181 may be fixed to motor housing 162.

Figure 4:
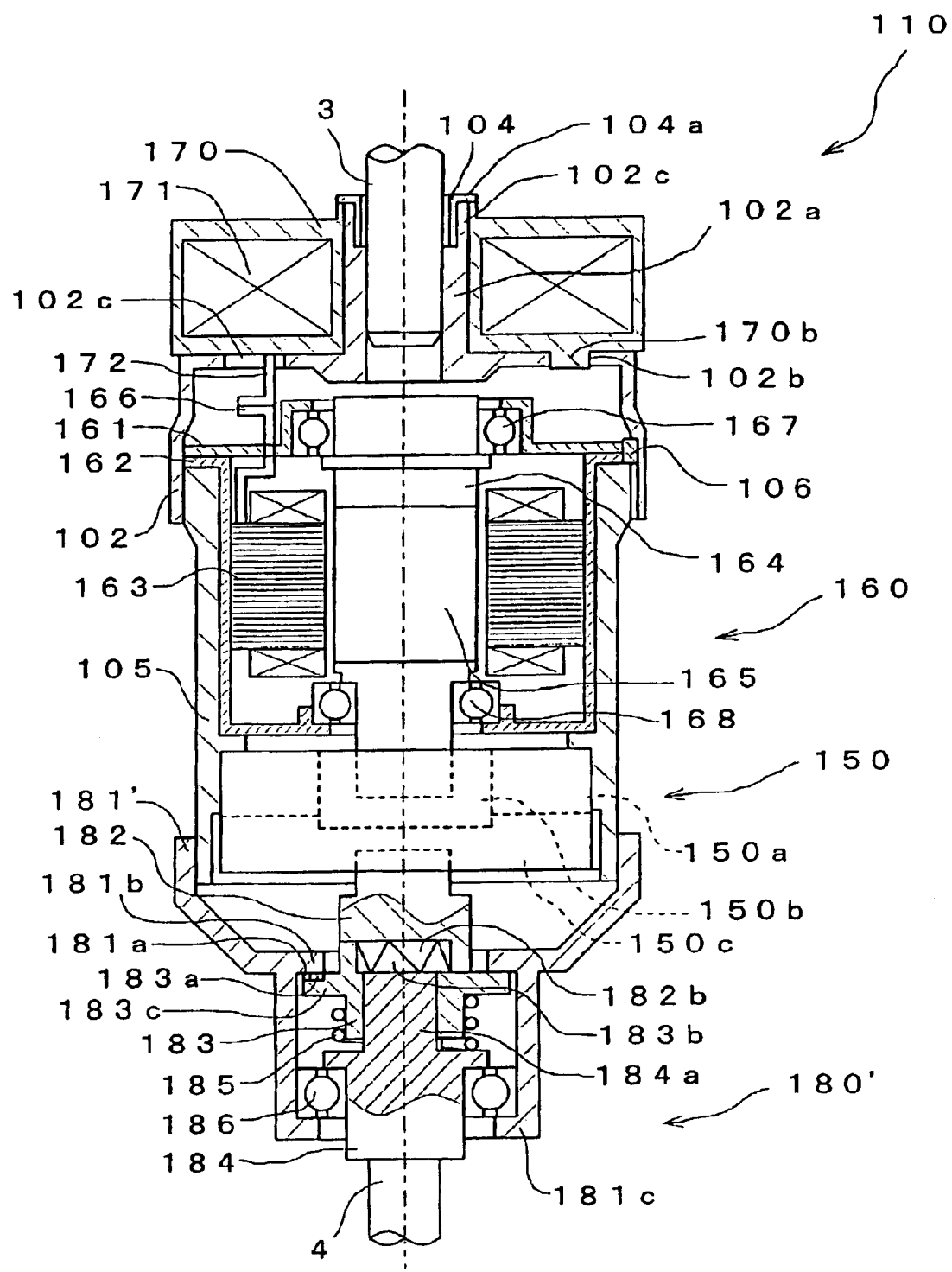
FIG. 4 is a lateral cross-sectional view of a transmission ratio variable mechanism according to a second embodiment of the present invention.

A second embodiment of the present invention will be explained referring to FIG. 4. The constructions of the second embodiment which are the same with the first embodiment are indicated with the common numerals and the explanations thereof are not repeated.

A transmission ratio variable mechanism 110 includes a first housing 102, a second housing, a spiral cable case 170, a motor 160, a speed reduction device 150, and a reverse input blocking device 180'.

The housing 102 and the spiral cable case 170 are arranged likewise the transmission ratio variable mechanism 100 of the first embodiment. The housing 105 is unitarily connected to the housing 102. The housing 105 is provided with the motor 160 and the speed reduction device 150 in this order from the input shaft side therein. A reverse input blocking device 180' is provided at the bottom end of the housing 105.

A fixed portion 150a of the speed reduction device 150 is provided not to be rotatable relative to the housing 105. An input portion 150b is connected to a motor rotational shaft 164 of the motor 160. An output portion 150c is connected to a drive shaft 182 of the reverse input blocking device 180'.

With the reverse input blocking device 180', the stationary member 181 of the reverse input blocking device 180 is replaced by a stationary member 181' having a large diameter portion. The large diameter portion of the stationary member 181' is unitarily connected to the housing 105 to serve as a part of the housing. The bottom steering shaft 4 is unitarily connected to the driven shaft 184.

The operation of the transmission ratio variable mechanism 110 when the rotational force from the steering wheel 2 side is input and the motor 160 normally functions will be explained.

When the rotational force is applied from the steering wheel 2, a control device (not shown) outputs a rotational command to the motor 160 in accordance with the steering amount of the steering wheel 2 and so on, and the rotational command is transmitted to the motor 160 via a spiral cable 171. The command operates the motor 160 to rotate the motor rotational shaft 164 relative to the motor housing 162. The rotation of the motor rotational shaft 164 is transmitted to the unitarily connected input portion 150b of the speed reduction device 150.

The rotational force from the steering wheel 2 is also transmitted to a fixed portion 150a of the speed reduction device 150 via a top steering shaft 3, the housing 102, and the housing 105. Relative rotational element from the motor 160 is added to the rotation directly transmitted from the steering wheel 2 to be transmitted to the drive shaft 182 of the reverse input blocking device 180 from the output portion 150c.

At the initial stage when the drive shaft 182 is rotated, because the clutch teeth 183a of the intermediate member 183 is geared with the clutch 181a of the stationary member 181', the intermediate member 183 cannot be rotated. When the rotational force affects the drive shaft 182, the intermediate member 183 is moved in the axial direction against the biasing force of a coil spring 185 by the function of thrust cams 182b, 183b. When the intermediate member 183 is moved in the axial direction, the geared connection between the clutch teeth 183a of the intermediate member 183 and the clutch teeth 181a of the stationary member 181' are eventually released. Thus, the intermediate member 183 is rotatable relative to the stationary member 181' to be unitarily rotated with the driven shaft 184. Accordingly, the rotation of the drive shaft 182 is transmitted to the driven shaft 184 and the bottom steering shaft 4.

In the foregoing manner, the rotation directly transmitted from the steering wheel 2 and the relative rotational element transmitted by the motor 160 is added at the speed reduction device 150 to be output to the bottom steering shaft 4 via the reverse input blocking device. Thus, the transmission ratio between the steering wheel 2 and the wheels 7 are varied.

The operation under the condition that the reverse input is applied from the wheels 7 side to the transmission ratio variable mechanism 110 will be explained as follows.

When the input is applied from the wheels 7 to the bottom steering shaft 4 side, the rotational force affects the driven shaft 184 of the reverse input blocking device 180'. However, because the clutch teeth 183a of the intermediate member 183 is geared with the clutch teeth 181a of the fixed stationary member 181', the driven shaft 184 is unrotatable relative to the stationary member 181'. Thus, the rotational force applied to the driven shaft 184 is transmitted to the stationary member 181' via the clutch teeth 183a, 181a to be transmitted to the steering wheel 2 via the housings 105, 102, and the top steering shaft 3.

In case the motor 160 is failed to stop, because the input from the motor 160 is not applied to the input portion 150b of the speed reduction device 150, the output portion 150c is not rotated not to apply the rotation to the drive shaft 182 of the reverse input blocking device 180'. Thus, the clutch teeth 181a of the stationary member 181' is remained to be geared with the clutch teeth 183a of the intermediate member 183. Thus, the rotation of the housing 103 is transmitted to the stationary member 181' of the reverse input blocking device 180', the intermediate member 183, and the driven shaft 184. Accordingly, the rotation of the steering wheel 2 is transmitted to the bottom steering shaft 4 via the housings 102, 105, and the reverse input blocking device 180' to turn the wheels 7.

Accordingly, with the transmission ratio variable mechanism 110, the steering can be achieved with a constant transmission ratio without generating the deviation between the turning amount of the wheels 7 and the steering amount of the steering wheel 2 without applying the electronic controlled type direct connection means even when the reverse input from the wheels 7 or the motor abnormality is generated.

Although the housing is separated into two portions with the embodiments of the present invention, the housing may be constructed in one unit in case ignoring the assembling performance.

According to the embodiments of the present invention, the transmission ratio variable mechanism can maintain the relation between the steering amount of the steering wheel and the turning amount of the wheels without providing the direct connection means which requires the additional detection means and the control means even when the reverse input from the wheels side or the abnormality of the motor is generated.

According to the embodiments of the transmission ratio variable mechanism of the present invention, the rotational force from the motor is always transmitted and the input of the rotation from other portions to the motor is blocked. Thus, the transmission ratio between the steering wheel and the wheels are varied by transmitting the motor rotation at the normal operation of the motor. The generation of the deviation between the steering amount of the steering wheel and the steering amount of the turning amount of the vehicle wheels can be prevented by not transmitting the rotational force to the motor under the condition that the reverse input is generated from the wheels or under the abnormality of the motor stop.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A transmission ratio variable mechanism for varying a transmission ratio between a steering amount of a steering wheel and a turning amount of wheels, comprising:
   an input shaft connected to receive a rotational force of the steering wheel;
   a housing unitarily rotating with the input shaft; an output shaft connected to wheels side; a motor fixed in the housing for transmitting its rotation to the output shaft via a speed reduction device; and
   a reverse input blocking means for always transmitting a rotational output from the motor to the output shaft and for always blocking a rotational input from the output shaft to the motor.

2. A transmission ratio variable mechanism according to claim 1, wherein the reverse input blocking means is provided between the motor and the speed reduction device.

3. A transmission ratio variable mechanism according to claim 1, wherein the reverse input blocking means is provided between the speed reduction device and the output shaft.

4. A transmission ratio variable mechanism according to claim 2, wherein the reverse input blocking means comprises:
   a drive shaft connected to a rotational shaft of the motor;
   a driven shaft connected to an input portion of the speed reduction device coaxially with the drive shaft;
   an intermediate member movably connected to the driven shaft in an axial direction, said intermediate member being engaged with the drive shaft via a cam means and engaged with the housing via a clutch means; and
   a spring means for biasing the intermediate member towards the drive shaft;

wherein the cam means moves the intermediate member in the axial direction against the biasing force of the spring member by the relative rotation between the intermediate member and the drive shaft to disengage the clutch means.

5. A transmission ratio variable mechanism according to claim 3, wherein the reverse input blocking means comprises:

a drive shaft connected to an output portion of the speed reduction device;

a driven shaft connected to an output shaft coaxially with the drive shaft;

an intermediate member movably connected to the driven shaft in an axial direction, said intermediate member being engaged with the drive shaft via a cam means and engaged with the housing via a clutch means; and a spring means for biasing the intermediate member towards the drive shaft;

wherein the cam means moves the intermediate member in the axial direction against the biasing force of the spring member by the relative rotation between the intermediate member and the drive shaft to disengage the clutch means.

6. A transmission ratio variable mechanism according to claim 4, wherein the housing includes a first housing operatively connected with the input shaft for transmitting the rotational force from the steering wheel, a second housing operatively connected to the first housing and the speed reduction device, and a stationary member having the clutch means and provided between the second housing and the intermediate member.

7. A transmission ratio variable mechanism according to claim 5, wherein the housing includes a first housing operatively connected with the input shaft for transmitting the rotational force from the steering wheel, a second housing operatively connected to the first housing and the speed reduction device, and a stationary member having the clutch means and provided at the bottom end of second housing.

8. A transmission ratio variable mechanism according to claim 1, wherein the reverse input blocking means is comprised of only mechanical parts.

9. A steering device including a transmission ratio variable mechanism for varying a transmission ratio between a steering amount of a steering wheel and a turning amount of wheels, comprising:

the steering wheel operated for providing a rotational force;

the wheels turned in accordance with the rotational force from the steering wheel;

a rack and pinion mechanism includes a rack shaft;

a transfer mechanism provided between the rack shaft and the wheels;

wherein the transmission ratio variable mechanism includes an input shaft connected to receive the rotational force of the steering wheel;

a housing unitarily rotating with the input shaft; an output shaft connected to the rack and pinion mechanism;

a motor fixed in the housing for transmitting the rotation to the output shaft via a speed reduction device; and a reverse input blocking means for always transmitting a rotational output from the motor to the output shaft and for always blocking a rotational input from the output shaft to the motor.

* * * * *